(12) United States Patent
Wong

(10) Patent No.: US 7,404,179 B2
(45) Date of Patent: Jul. 22, 2008

(54) FAST SOURCE FILE TO LINE NUMBER TABLE ASSOCIATION

(75) Inventor: Kendrick Wong, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 10/942,420

(22) Filed: Sep. 16, 2004

(65) Prior Publication Data

US 2006/0059467 A1  Mar. 16, 2006

(51) Int. Cl.
*G06F 9/44* (2006.01)
(52) U.S. Cl. .................. 717/124; 717/125; 717/129
(58) Field of Classification Search ............. 717/124, 717/125, 129; 707/3
See application file for complete search history.

(56) References Cited

U.S. PATENT DOCUMENTS

| | | | | |
|---|---|---|---|---|
| 5,129,082 | A | | 7/1992 | Tirfing et al. .............. 395/600 |
| 5,339,431 | A | | 8/1994 | Rupp et al. ................. 395/700 |
| 5,426,648 | A | | 6/1995 | Simamura .................... 371/19 |
| 5,446,900 | A | | 8/1995 | Kimelman .................. 395/700 |
| 5,651,111 | A | | 7/1997 | McKeeman et al. ..... 395/183.14 |
| 5,680,622 | A | | 10/1997 | Even .......................... 395/709 |
| 5,774,724 | A | * | 6/1998 | Heisch ....................... 717/129 |
| 5,887,173 | A | * | 3/1999 | Ogawa et al. .............. 717/113 |
| 5,987,248 | A | * | 11/1999 | Murayama et al. ......... 717/125 |
| 6,077,312 | A | * | 6/2000 | Bates et al. ................ 717/129 |
| 6,091,896 | A | * | 7/2000 | Curreri et al. .............. 717/125 |
| 6,249,907 | B1 | * | 6/2001 | Carter et al. ............... 717/129 |
| 6,298,479 | B1 | | 10/2001 | Chessin et al. .............. 717/10 |
| 6,634,020 | B1 | * | 10/2003 | Bates et al. ................ 717/131 |
| 6,658,649 | B1 | * | 12/2003 | Bates et al. ................ 717/124 |
| 2003/0182330 | A1 | | 9/2003 | Manley et al. .............. 707/205 |

FOREIGN PATENT DOCUMENTS

| | | | |
|---|---|---|---|
| JP | 5100866 | A | 4/1993 |
| JP | 5204708 | A | 8/1993 |

OTHER PUBLICATIONS

Wahbe, et al. "Practical Data Breakpoints: Design and Implementation", 1993, ACM, pp. 1-12.*
IBM Technical Disclosure Bulletin, vol. 29, No. 3, Aug. 1986. "Enhanced Hashed Prefetch Confirmation", pp. 1415.
IBM Technical Disclosure Bulletin, vol. 29, No. 6, Nov. 1986, "Table-Driven Approach to Multi-File Interface", pp. 2538-2541.

\* cited by examiner

*Primary Examiner*—Wei Y. Zhen
*Assistant Examiner*—Qamrun Nahar
(74) *Attorney, Agent, or Firm*—Duke W. Yee; Libby Z. Hardelsman; Wayne P. Bailey

(57) ABSTRACT

A mechanism is provided in a debugger for building a file information database while significantly reducing debug startup time. For each line number table, the mechanism of the present invention reads the header section and determines all the source files that contribute to the line number table. The mechanism also makes note of the line number table offset. The mechanism then inserts the source filename into the file information database. In one preferred embodiment, the file information database is implemented as a hash table. Searching time occurs during an interactive debug session; therefore, the searching time is not easily detectable to a user, thus creating the perception of a faster interactive debugging session.

4 Claims, 4 Drawing Sheets total line info length 197 bytes, line offset 0x0 0
compilation_directory /usr/src/build/
   min instruction length 1
   default is stmt     1
   line base          -5
   line_range       14
...   [start of source file information]
file [0]   init.c
    dir index 0
    last time 0x0 Wed Dec 31 19:00:00 1969
    file length 0 0x0
  file[1]  ../sysdeps/generic/bits/types.h
    dir index 0
    last time 0x0 Wed Dec 31 19:00:00 1969
    file length 0 0x0
dir index 0 ←                                         STOP DECODING HERE
    last time 0x0 Wed Dec 31 19:00:00 1969
    file length 0 0x0
    statement prog offset in section: 201 0xc9
...   [start of line number entries]
  [0x00019c] DW_LNE_set_address address 0x80483c3
  [0x0001a3] DW_LNS_advance_line va1 33 0x21
...

*FIG. 5*

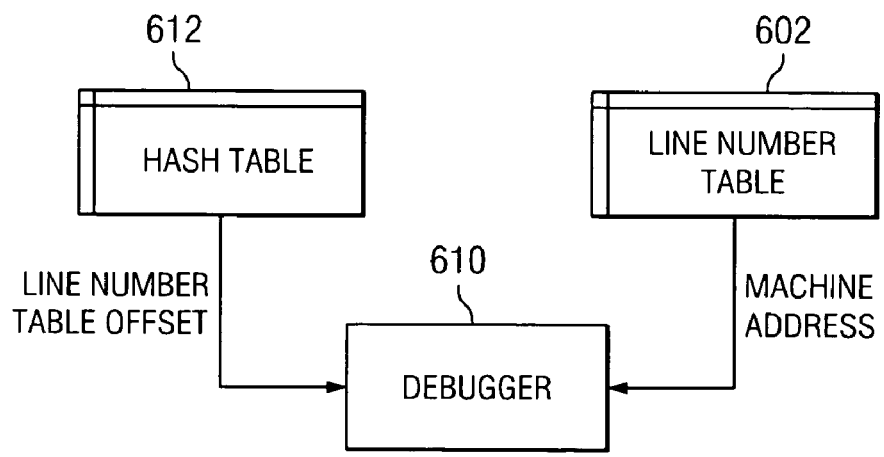

*FIG. 6*

FAST SOURCE FILE TO LINE NUMBER TABLE ASSOCIATION

BACKGROUND OF THE INVENTION

1. Technical Field

The present invention relates to data processing and, in particular, to debugging software code. Still more particularly, the present invention provides a method, apparatus, and program product for fast source file to line number table association in a debugger.

2. Description of Related Art

A debugger is software that helps a programmer debug a program by stopping at certain breakpoints and displaying various programming elements. The programmer can step through source code statements one at a time while the corresponding machine instructions are being executed. Many debuggers allow users to set a breakpoint by identifying a filename and a line number. A debugger does so by mapping the given filename and line number to a machine address in a line number table.

Thus, when the debugger encounters a breakpoint in the form of a filename and a line number, the debugger may examine the line number table for the file and determine the corresponding machine address. Assuming an application contains multiple compilation units and every compilation unit produces at least one line number table, searching through all the line number tables within the application to find entries corresponding to the given filename may be a computationally expensive task.

One common approach to solve this problem is to build a persistent table to keep track of the relationship between the filename and the corresponding line number table. Building this table, referred to as the "file information database," is computationally expensive, but needs to be done once per debugging session. Depending on when the file information database is built, this process may cause a long debug session startup time or a long wait time when the user sets a breakpoint for the very first time. However, the advantage of the file information database is to allow efficient access to the line number information for subsequent queries.

SUMMARY OF THE INVENTION

The present invention recognizes the disadvantages of the prior art and provides a mechanism for building a file information database while significantly reducing debug startup time. For each line number table, the mechanism of the present invention reads the header section and determines all the source files that contribute to the line number table. The mechanism also makes note of the line number table offset. The mechanism then inserts the source filename into the file information database. In one preferred embodiment, the file information database is implemented as a hash table.

The hash table stores this information as key:value pair, where the source filename is the key and the line number table offset is the value. Searching for an entry in the file information database involves searching through the hash table. This searching time occurs during an interactive debug session; therefore, the searching time is not easily detectable to a user, thus creating the perception of a faster interactive debugging session.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts an example header of a line number table in accordance with a preferred embodiment of the present invention;

FIG. 6 is a block diagram illustrating the operation of a debugger during a query in accordance with an exemplary embodiment of the present invention;

DETAILED DESCRIPTION OF THE PREFERRED EMBODIMENT

Figure 1:
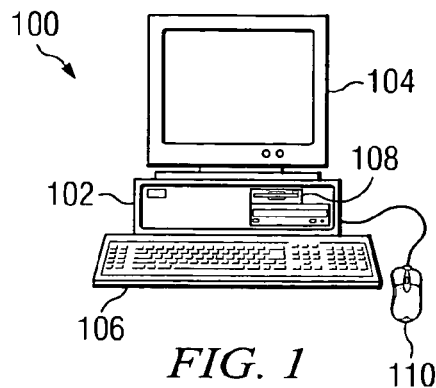
FIG. 1 is a pictorial representation of a data processing system in which the present invention may be implemented in accordance with a preferred embodiment of the present invention.
Figure 2:
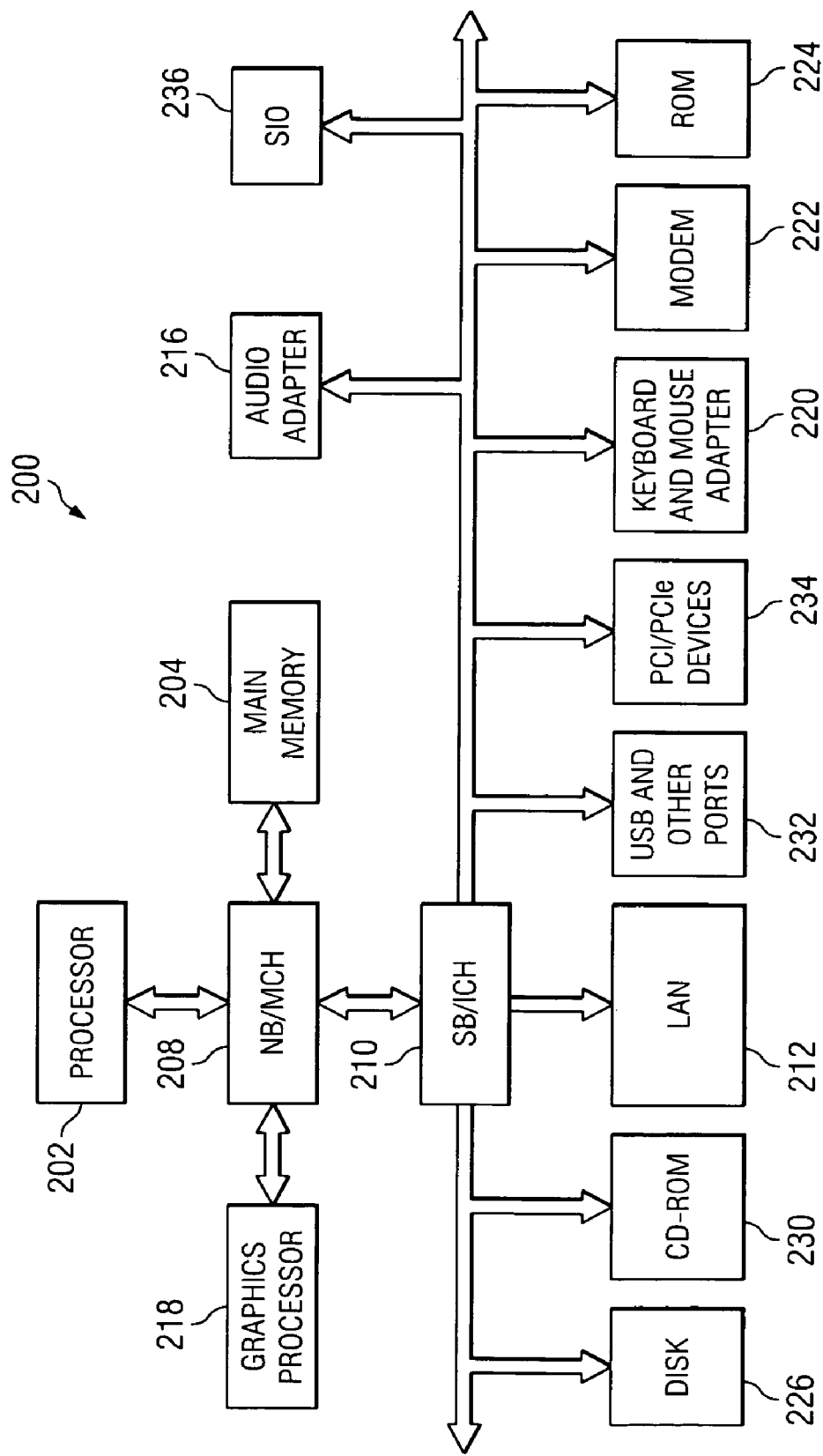
FIG. 2 is a block diagram of a data processing system in which the present invention may be implemented.

The present invention provides a method, apparatus and computer program product for fast source file to line number table association in a debugger. The data processing device may be a stand-alone computing device or may be a distributed data processing system in which multiple computing devices are utilized to perform various aspects of the present invention. Therefore, the following FIGS. 1 and 2 are provided as exemplary diagrams of data processing environments in which the present invention may be implemented. It should be appreciated that FIGS. 1 and 2 are only exemplary and are not intended to assert or imply any limitation with regard to the environments in which the present invention may be implemented. Many modifications to the depicted environments may be made without departing from the spirit and scope of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 can be implemented using any suitable computer, such as an IBM eServer™ computer or IntelliStation® computer, which are products of International Business Machines Corporation, located in Armonk, N.Y. Although the depicted representation shows a computer, other embodiments of the present invention may be implemented in other types of data processing systems, such as a network computer.

Computer 100 also preferably includes a graphical user interface (GUI) that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 208 and a south bridge and input/output (I/O) controller hub (ICH) 210. Processor 202, main memory 204, and graphics processor 218 are connected to MCH 208. Graphics processor 218 may be connected to the MCH through an accelerated graphics port (AGP), for example.

In the depicted example, local area network (LAN) adapter 212, audio adapter 216, keyboard and mouse adapter 220, modem 222, read only memory (ROM) 224, hard disk drive (HDD) 226, CD-ROM driver 230, universal serial bus (USB) ports and other communications ports 232, and PCI/PCIe devices 234 may be connected to ICH 210. PCI/PCIe devices may include, for example, Ethernet adapters, add-in cards, PC cards for notebook computers, etc. PCI uses a cardbus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to ICH 210.

An operating system runs on processor 202 and is used to coordinate and provide control of various components within data processing system 200 in FIG. 2. The operating system may be a commercially available operating system such as Windows XP™, which is available from Microsoft Corporation. An object oriented programming system, such as Java™ programming system, may run in conjunction with the operating system and provides calls to the operating system from Java™ programs or applications executing on data processing system 200. "JAVA" is a trademark of Sun Microsystems, Inc. Instructions for the operating system, the object-oriented programming system, and applications or programs are located on storage devices, such as hard disk drive 226, and may be loaded into main memory 204 for execution by processor 202. The processes of the present invention are performed by processor 202 using computer implemented instructions, which may be located in a memory such as, for example, main memory 204, memory 224, or in one or more peripheral devices 226 and 230.

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. Also, the processes of the present invention may be applied to a multiprocessor data processing system.

The present invention provides a mechanism in a debugger is provided for building a file information database while significantly reducing debug startup time. The debugger builds a line number table for each source file in the application. A line number table associates line numbers in the source file with machine addresses in the data processing system. DWARF and DWARF3, or DWARF 3.0, are known line number table formats for debuggers. The present invention may apply to the DWARF3 line number table format; however, the mechanism of the present invention may work with other line number formats.

A file information database stores relationships between filenames and corresponding line number tables. A file information database allows efficient access to the line number information for subsequent queries. However, there are performance bottlenecks in performing a lookup to a given line number table. For instance, one must determine all the source files that contribute to a given line number table. The obvious approach to solve this bottleneck is to decode the entire line number table and extract all the information related to that table. The running time for this operation is proportional to the number of lines in the line number table.

As another example, the debugger must insert the extracted information into the file information database. To allow fast retrieval of information, the source file names may be sorted. The average running time for sorting is O(nlog(n)), where n is the number of source files. In addition, searching the file information database for a source filename and line number table pair is computationally intensive and time consuming. If the source file names are already sorted, then binary search can be used to retrieve the information. The running time for a binary search is O(log(n)), where n is the number of total source files.

Determining all the source files that contribute to each line number table and inserting information into the file information database must be performed only once per debugging session. Once these steps are performed, the retrieval of information is quite efficient. However, the running time for both of these steps is significantly long. Most debugging sessions are interactive and, depending upon when this setup is done, the setup would either translate to a noticeably long debug session startup time or a long wait time when the user issues a command that invokes this functionality for the very first time.

Figure 3:
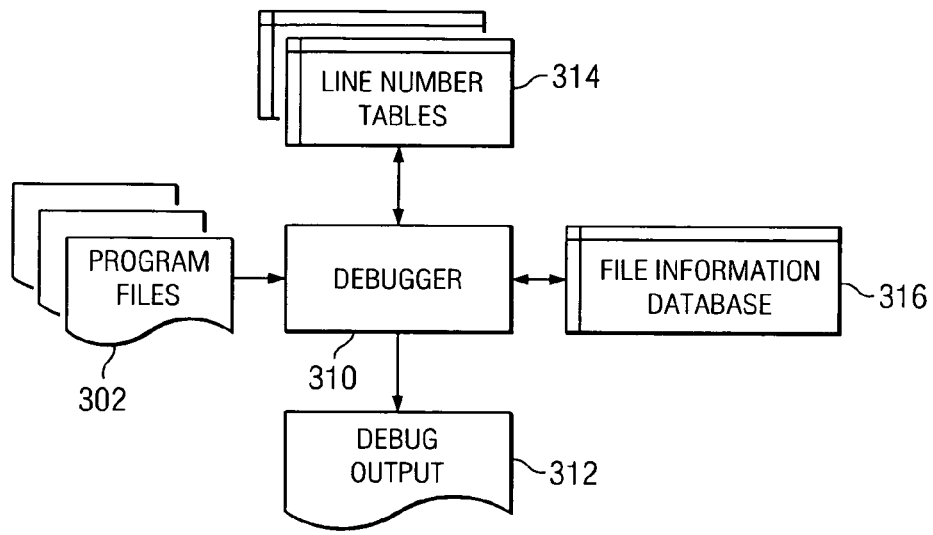
FIG. 3 is a block diagram illustrating a debugger environment in accordance with an exemplary embodiment of the present invention.

FIG. 3 is a block diagram illustrating a debugger environment in accordance with an exemplary embodiment of the present invention. Debugger receives program files 302 and line number tables 314 from the debug information provided. For each one of line number tables 314, debugger 310 reads the header section and determines all the source files that contribute to the line number table. Debugger 310 also makes note of the line number table offset. Debugger 310 then inserts the source filename into file information database 316. File information database 316 may be implemented as a hash table, for example. Results of debugging are presented as debug output 312.

Figure 4:
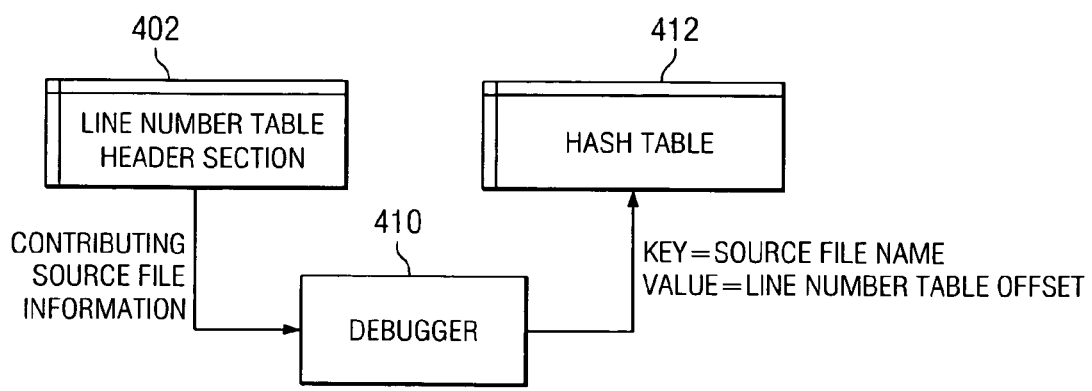
FIG. 4 illustrates a debugger setup environment in accordance with an exemplary embodiment of the present invention.

FIG. 4 illustrates a debugger setup environment in accordance with an exemplary embodiment of the present invention. A debug line information section stores multiple line number tables. Because a single source file can exist in more than one compilation unit, it is necessary to process the entire debug line information section to determine the relationship between source file and line number table. For a given line number table, debugger 410 examines line number table header section 402 and extracts contributing source file information.

Debugger 410 then inserts an entry for each contributing source file into has table 412 as a key:value pair, where the source filename is the key and the line number table offset is the value. The worst case running time for a hash table insertion is O(1). This is much more efficient than sorting the file information database.

FIG. 5 depicts an example header of a line number table in accordance with a preferred embodiment of the present invention. The running time of this decoding scheme is proportional to the number of source files in the line number table. Because the debugger stops decoding at the end of the source file information in the header, decoding is much more efficient than decoding the entire line number table.

FIG. 6 is a block diagram illustrating the operation of a debugger during a query in accordance with an exemplary embodiment of the present invention. Debugger 610 searches for an entry in the hash table 612 to obtain a line number table offset. Given the line number table offset, debugger 610 may obtain a machine address from the appropriate line number table, such as line number table 602.

The searching operation of the present invention has a worst-case running time of O(n) and a best-case running time of O(1), where n is the total number of source files. The worst-case running time performance is worse than a binary search algorithm with a sorted file information database; however, because the searching time occurs during an interactive debug session, the searching time is not easily detectable to a user. Effectively, the table building time is spread across each individual query, thereby achieving the perception of a faster interactive debugging session.

Figure 7:
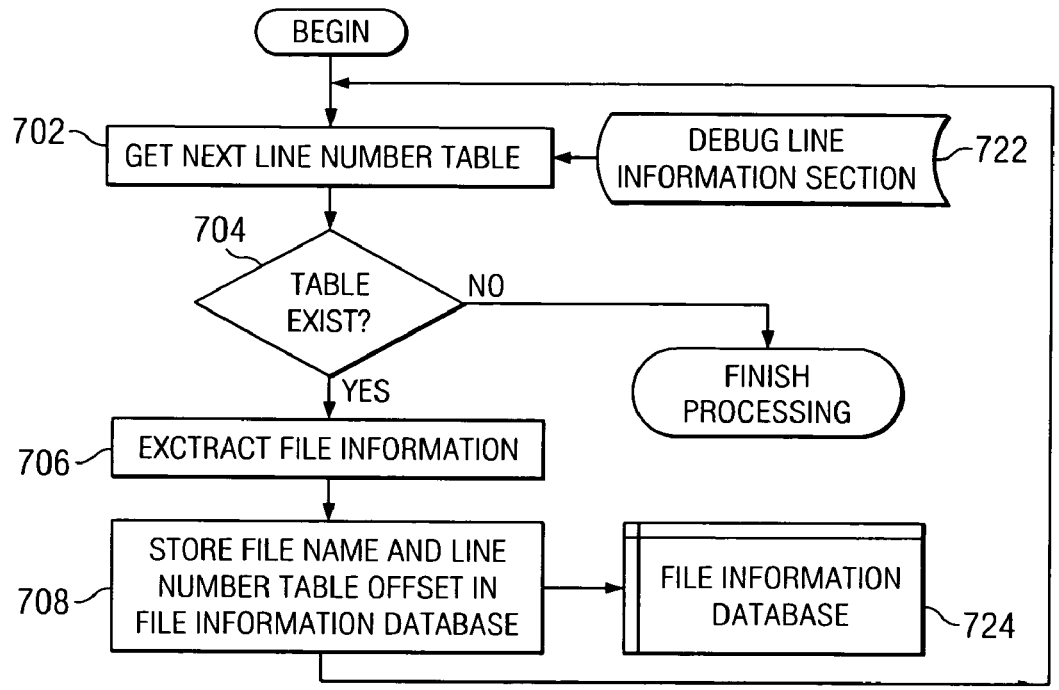
FIG. 7 is a flowchart illustrating the operation of associating files to line number tables in a debugger in accordance with an exemplary embodiment of the present invention.

FIG. 7 is a flowchart illustrating the operation of associating files to line number tables in a debugger in accordance with an exemplary, embodiment of the present invention. Operation begins and the debugger gets the next line number table from debug line information section 722 (block 702). The debugger then determines whether a table exists (block 704). If a table does not exist, then the debugger finishes processing.

If a table exists in block 704, the debugger extracts file information from the header of the line number table (block 706). Then, the debugger stores the file name and the line number table offset in the file information database 724 (block 708). Next, operation returns to block 702 to get the next line number table. Operation repeats until all of the line number tables in debug line information section 722 are processed.

Figure 8:
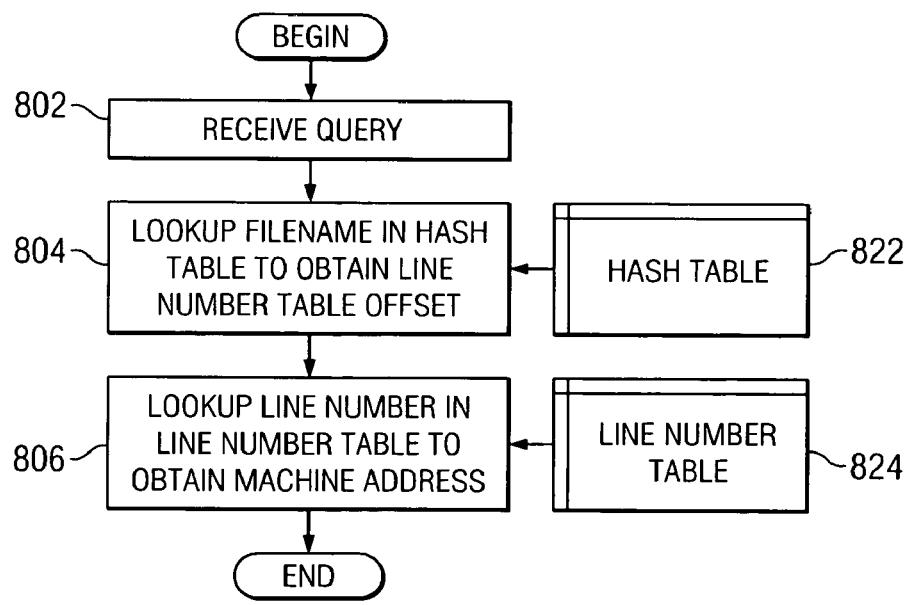
FIG. 8 is a flowchart illustrating the operation of a query in a debugger in accordance with an exemplary embodiment of the present invention.

FIG. 8 is a flowchart illustrating the operation of a query in a debugger in accordance with an exemplary embodiment of the present invention. Operation begins and the debugger receives a query, which consists of a filename and a line number (block 802). The debugger then looks up the filename in hash table 822 to obtain a line number table offset (block 804). Next, the debugger looks up the line number in line number table 824, given the line number table offset, to obtain a machine address (block 806). Thereafter, operation ends.

Thus, the present invention provides a mechanism for building a file information database while significantly reducing debug startup time. For each line number table, the mechanism of the present invention reads the header section and determines all the source files that contribute to the line number table. The mechanism also makes note of the line number table offset. The mechanism then inserts the source filename into the file information database. In one preferred embodiment, the file information database is implemented as a hash table.

Searching time occurs during an interactive debug session; therefore, the searching time is not easily detectable to a user, thus creating the perception of a faster interactive debugging session.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for associating files with line number table in a debugger, the method comprising:

for each line number table, examining header information for source files that contribute to the line number table, wherein the line number table associates line numbers in the source files with machine addresses of executable code that is executable by the debugger; and for each source file that contributes to a line number table, storing an entry in a file information database, wherein the entry associates the source file with a line number table offset, wherein the line number table offset is an offset with respect to the line number table, wherein the file information database includes a hash table, wherein storing the entry in the file information database includes storing a key:value pair in the hash table, and wherein a name of the source file is a key of the key:value pair and the line number table offset is a value of the key:value pair.

2. The method of claim 1, further comprising:

receiving a query for a breakpoint, wherein the query includes a filename of a source file and a line number;

looking up the filename in the file information database to obtain a line number table offset; and looking up the line number using the line number table offset to obtain a machine address.

3. A method, in a data processing system, for setting a breakpoint in a debugger, the method comprising:

for each line number table, examining header information for source files that contribute to the line number table, wherein the line number table associates line numbers in the source files with machine addresses of executable code that is executable by the debugger;

for each source file that contributes to a line number table, storing an entry in a file information database, wherein the entry associates the source file with a line number table offset, wherein the line number table offset is an offset with respect to the line number table;

receiving a query for a breakpoint, wherein the query includes a filename and a line number;

looking up the filename in a file information database to obtain a line number table offset; and looking up the line number using the line number table offset to obtain a machine address, wherein the file information database includes a hash table comprising a plurality of key:value pairs, wherein the filename is a key of one of the key:value pairs and the line number table offset is a value of the one of the key:value pairs.

4. The method of claim 3, wherein the machine address is obtained from a line number table.

* * * * *